US008320732B2

(12) United States Patent (10) Patent No.: US 8,320,732 B2
Lee (45) Date of Patent: Nov. 27, 2012

(54) PRODUCTION OF MULTIMEDIA CONTENT

(75) Inventor: Hsieh-Te Lee, Taoyuan (TW)

(73) Assignee: Cyberlink Corp., Shindian, Taipei (TW)

( * ) Notice: Subject to any disclaimer, the term of this patent is extended or adjusted under 35 U.S.C. 154(b) by 620 days.

(21) Appl. No.: 12/485,198

(22) Filed: Jun. 16, 2009

(65) Prior Publication Data
US 2010/0319045 A1 Dec. 16, 2010

(51) Int. Cl.
H04N 5/775 (2006.01)
(52) U.S. Cl. ........................... 386/230; 386/232
(58) Field of Classification Search .................. 386/230, 386/232
See application file for complete search history.

(56) References Cited

U.S. PATENT DOCUMENTS

| | | | |
|---|---|---|---|
| 6,314,574 B1 | 11/2001 | Chan | |
| 2002/0046176 A1 | 4/2002 | Seo et al. | |
| 2002/0059574 A1* | 5/2002 | Tudor et al. | 725/1 |
| 2005/0114470 A1* | 5/2005 | Bal | 709/219 |
| 2005/0195694 A1* | 9/2005 | Lin | 369/30.04 |
| 2006/0271695 A1* | 11/2006 | Lavian | 709/229 |
| 2007/0081798 A1 | 4/2007 | Peng et al. | |
| 2007/0168376 A1 | 7/2007 | Luitjens et al. | |
| 2007/0294740 A1* | 12/2007 | Drake et al. | 725/131 |
| 2008/0101191 A1 | 5/2008 | Taylor et al. | |
| 2008/0133564 A1* | 6/2008 | Gandolph et al. | 707/101 |
| 2008/0251575 A1* | 10/2008 | Bowling et al. | 235/375 |
| 2008/0288868 A1* | 11/2008 | Lakey et al. | 715/716 |
| 2010/0189411 A1* | 7/2010 | Ogikubo | 386/52 |
| 2010/0242079 A1* | 9/2010 | Riedl et al. | 725/115 |
| 2010/0262833 A1* | 10/2010 | Zollinger et al. | 713/180 |
| 2010/0281383 A1* | 11/2010 | Meaney et al. | 715/723 |

* cited by examiner

*Primary Examiner* — Thai Tran
*Assistant Examiner* — Jose Mesa
(74) *Attorney, Agent, or Firm* — McClure, Qualey & Rodack, LLP

(57) ABSTRACT

A computer readable medium and method for production of multimedia content are provided. In this regard, one embodiment of such a computer readable medium, among others, can be broadly summarized as including instructions executable by a computer that control the computer to perform importing a source content; receiving a selection of a first portion of the imported source content; generating an instructional content, wherein the instructional content comprises a first server identifying content and a relation between the first portion of the imported source content and a second portion of the imported source content; exporting the first portion of the imported source content for storage as at least a portion of a first server multimedia content on a first server; and burning, on an optical disc, the second portion of the imported source content and the instructional content as at least a portion of an optical disc multimedia content.

23 Claims, 16 Drawing Sheets

PRODUCTION OF MULTIMEDIA CONTENT

CROSS-REFERENCE TO RELATED APPLICATIONS

This application is related to the copending U.S. Utility Application entitled, "Revision of Multimedia Content," having Ser. No. 12/389,620, filed Feb. 20, 2009.

TECHNICAL FIELD

Embodiments disclosed herein are generally related to multimedia and, more particularly, are related to the production of multimedia content.

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Producing movies was at one time thought of as a task only performed by professional studios. However, advances in computing hardware and software technology have enabled amateurs and non-professionals to produce their own movies at home. For example, amateurs or non-professionals may record a video using a personal digital camcorder and transfer the recorded video to a personal computer. The personal computer may be used to manipulate the recorded video to create a home movie. As a further example, musicians can record, manipulate, and mix audio in a digital format to create new songs using a personal computer. The songs or home movies may be stored on the personal computer or on an optical disc. Optical discs such as compact discs or digital video discs are popular storage media for video and/or audio bitstreams. Current generations of optical disc media such as blue-ray discs and high definition digital video discs can even offer higher data storage capacities.

SUMMARY

Embodiments described in the present disclosure provide production of multimedia content. Briefly described, in one embodiment, among others, a computer readable medium comprises instructions executable by a computer that control the computer to perform: importing a source content; receiving a selection of a first portion of the imported source content; generating an instructional content, wherein the instructional content comprises a first server identifying content and a relation between the first portion of the imported source content and a second portion of the imported source content; exporting the first portion of the imported source content for storage as at least a portion of a first server multimedia content on a first server; and burning, on an optical disc, the second portion of the imported source content and the instructional content as at least a portion of an optical disc multimedia content.

Also, in another embodiment, a method for producing multimedia content is provided. In this regard, one embodiment of such a method, among others, can be broadly summarized by the following: providing user interface; importing a plurality of audiovisual clips; receiving a selected audiovisual clip for publishing on a first server, wherein the imported plurality of audiovisual clips includes the selected audiovisual clip and at least one nonselected audiovisual clip; associating the selected audiovisual clip with the first server; generating an instructional content, wherein the instructional content comprises the first server identifying content and an association between the selected audiovisual clip and the first server; exporting the selected audiovisual clip to the first server; and burning the at least one nonselected audiovisual clip and a first server identifying content onto an optical disc, wherein the first server identifying content identifies the first server.

Other systems, methods, features, and advantages of embodiments described in the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the various embodiments described in the present disclosure. Moreover, in the drawings, like reference numerals designate corresponding parts throughout the several views.

DETAILED DESCRIPTION

The following disclosure describes a system and/or method for producing multimedia content. For example, a user may wish to create a home movie. The user may want to store portions of the home movie on an optical disc and other portions on a server that can be accessed when the optical disc is played on a video playback device that has an Internet connection, such as a BD-Live player or iHD player. By storing the home movie in this manner, the portions of the home movie that are stored on the server are updatable or may contain content too large for storing on the optical disc. To create this home movie, a user can use a user interface on a computer provided by software or hardware. Using the user interface, video clips can be imported from a digital camcorder and/or audio clips can be imported from an audio recorder. Then, the user can select the audiovisual clips to be uploaded to the server, and the remaining audiovisual clips will be for burning onto the optical disc. The user can also use the user interface to edit the imported clips as well as arrange the imported clips on a storyboard or timeline to create the home movie. The user can also add other content such as menus or subtitles. When the user is finished developing the home movie, the user can trigger the uploading of the selected clips to the server and the burning of the remaining clips onto the optical disc. Then, when the user plays the burned optical disc on a video playback device that has an Internet connection, such as, for example, the Sony Playstation III (which is a type of BD disc player), Xbox (which is a type of iHD player), or a BD-Live disc player, the user can view the home movie including both the clips stored on the optical disc as well as the clips stored on the server.

Figure 1:
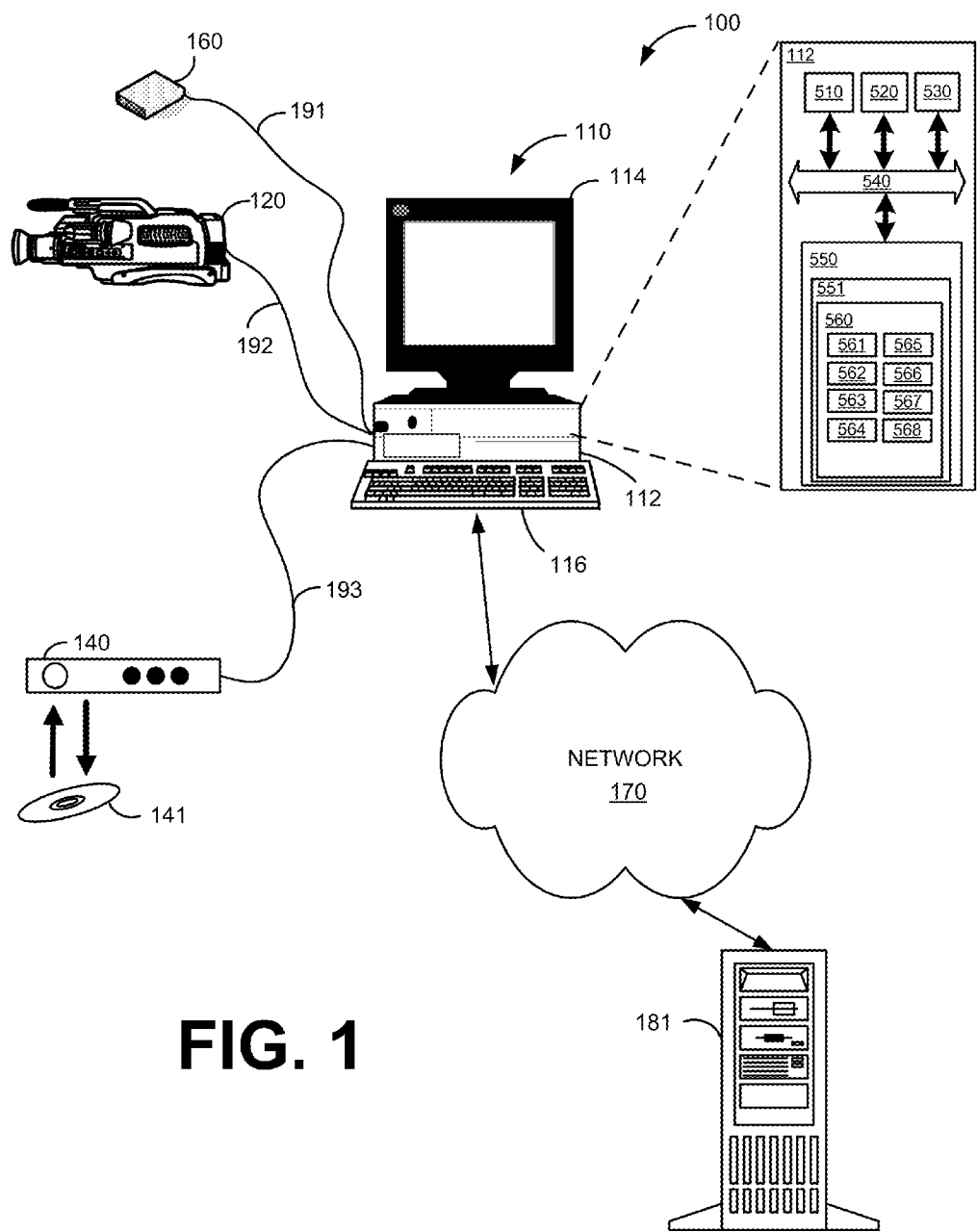
FIG. 1 illustrates a diagram of a first embodiment of a system for producing multimedia content.

FIG. 1 illustrates a first embodiment of a system 100 for producing multimedia content. In FIG. 1, the system 100 for producing multimedia content includes a personal computer 110. The personal computer 110 includes a computing device 112, a display 114, and a user input device 116. In the embodiment illustrated in FIG. 1, the user input device 116 is a keyboard. Other embodiments include additional or different user input devices such as a mouse, touchscreen, and/or one or more of a variety of other devices. The display 114 and the user input device 116 are coupled to the computing device 112. The computing device 112 includes a memory 550 that stores an operating system 551. Also, an application specific software 560 including executable modules 561, 562, 563, 564, 565, 566, 567 and 568 is stored in the operating system 551. The computing device 112 will be discussed in further detail below with respect to FIG. 5.

Referring again to FIG. 1, a video recorder 120 is coupled to the personal computer 110 via an electrical cable 192. In some embodiments, the video recorder 120 is, for example, a digital camcorder or webcam which records video content in a variety of digital formats. It should be noted that the video content may be in any of a number of formats including, but not limited to, Motion Picture Experts Group (MPEG)-1, MPEG-2, MPEG-4, H.264, VC-1, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), or any number of other digital video formats. The video content can be imported from the video recorder 120 to the personal computer 110 using the cable 192.

Additionally, an audio recorder 160 is coupled to the personal computer 110 via an electrical cable 191. In some embodiments, the audio recorder 160 is, for example, a digital audio recorder that includes a microphone and a memory. The audio recorder 160 may record audio content in one of variety of digital formats including, but not limited to, MPEG-1 Audio Layer II (MP2), MPEG-1 Audio Layer III (MP3), Waveform Audio Format (WAV), or Windows Media Audio (WMA), for example. The audio content is transferred from the audio recorder 160 to the personal computer 110 over the cable 191.

An optical disc drive 140 is coupled to the personal computer 110 as well, and the optical disc drive 140 that receives and read an optical disc 141. The optical disc drive 140 is coupled to the computing device 112 by an electrical cable 193, which transfers an optical disc source content read by the optical disc drive 140 from the optical disc 141 to the personal computer 110. The optical disc drive 140 can also embed or burn content onto the optical disc 141, if the optical disc 141 is writeable. The content burned onto the optical disc 141 may be in the form of a multimedia bitstream. The cable 193 also transfers or imports content from the personal computer 110 to the optical disc drive 140. In some embodiments, the optical disc drive 140 may be referred to as an optical disc burner.

In the embodiment illustrated in FIG. 1, cables 191, 192, 193 couple the audio recorder 160, the video recorder 120, and the optical disc drive 140, respectively, to the personal computer 110. These cables 191, 192, 193 may be any number of common computer interface cables, such as, but not limited to IEEE-1394 High Performance Serial Bus (Firewire), Universal Serial Bus (USB), a serial connection, or a parallel connection. In other embodiments, at least one of the devices may be coupled to the personal computer 110 over optical fiber, a wireless connection, or other communication path.

The optical disc 141 may be a magneto-optical disc, a blue-ray disc (BD), a blue-ray disc rewritable (BD-RE), a blue-ray disc write-once (BD-R), a high-definition digital video disc (HD DVD), a high-definition digital video disc rewritable (HD DVD-RW), a high-definition digital video disc random access memory (DVD-RAM), a high-definition digital video disc recordable (HD DVD-R), a digital video disc (DVD), a digital video disc rewritable (DVD-RW), a digital video disc rewritable (DVD+RW), a digital video disc recordable (DVD-R), a digital video disc once-writeable (DVD+R), a digital video disc random access memory (DVD-RAM), a holographic versatile disc, a universal media disc, a versatile multi-layer disc, a enhanced versatile disc (EVD), a compact disc (CD), a compact disc recordable (CD-R), or a compact disc rewritable (CD-RW).

In other embodiments, other devices storing content may be coupled to, and/or is in communication with, the personal computer 110. For example, these devices may include digital cameras, scanners, personal digital assistants (PDAs), speakers, cellular phones, microphones, printers, flash drives, hard drives, and/or one or more of a variety of other devices. Further, in other embodiments, fewer devices than those illustrated may be coupled to, and/or in communication with, the personal computer 110.

In the embodiment illustrated in FIG. 1, the personal computer 110 forms a node on a network 170. The network 170 includes a Public Switched Telephone Network (PSTN), a Mobile Telephone Network, the Internet, a Local Area Network (LAN), a Wide Area Network (WAN), and/or other networks. Also, content can be delivered to and/or from the first server 181 over the network 170 to the personal computer 110. In some embodiments, the content is in the form of a multimedia bitstream. The connection between the first server 181 and the personal computer 110 is one or more of any number of standard networking connections such as a category-5 (CAT-5), Firewire, ethernet or wireless connection. Finally, various components of embodiments reside on the computing device 112, and will be discussed in further detail herein.

Figure 2:
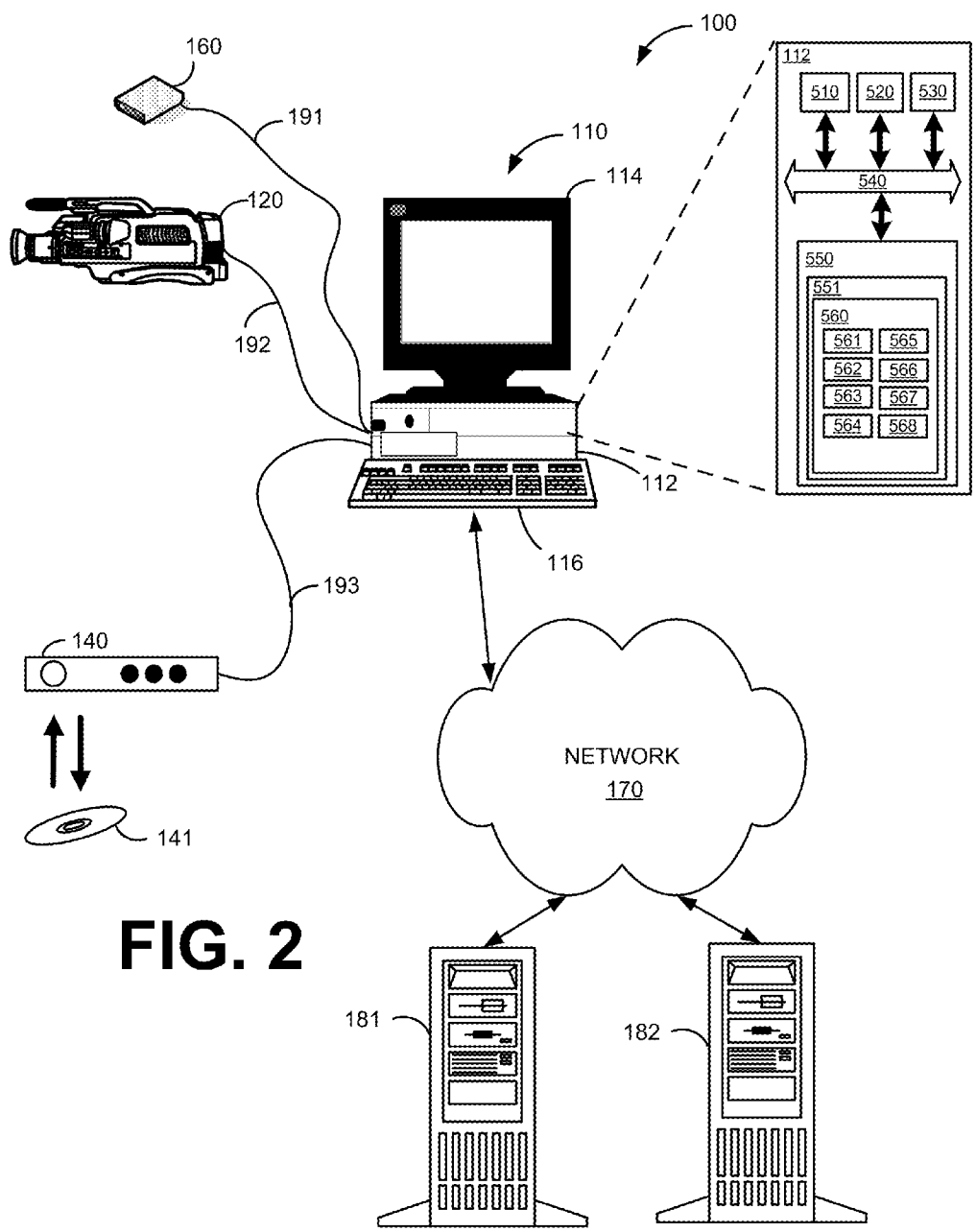
FIG. 2 illustrates a diagram of a second embodiment of a system for producing multimedia content.

FIG. 2 illustrates a second embodiment of a system 100 for producing multimedia content. Storing content on more than one server for redundancy purposes or for additional space, for example, may be useful. To that end, in addition to the features depicted in FIG. 1, the system 100 for producing multimedia content illustrated in FIG. 2 also includes a second server 182 coupled to, and/or is in communication with, the personal computer 110 over the network 170. Content can be delivered to and/or from the second server 182 over the network 170 to the personal computer 110. In some embodiments, the content is in the form of a multimedia bitstream. The connection between the second server 182 and the personal computer 110 is one or more of any number of standard networking connections such as a CAT-5, Firewire, ethernet or wireless connection.

Figure 3A:
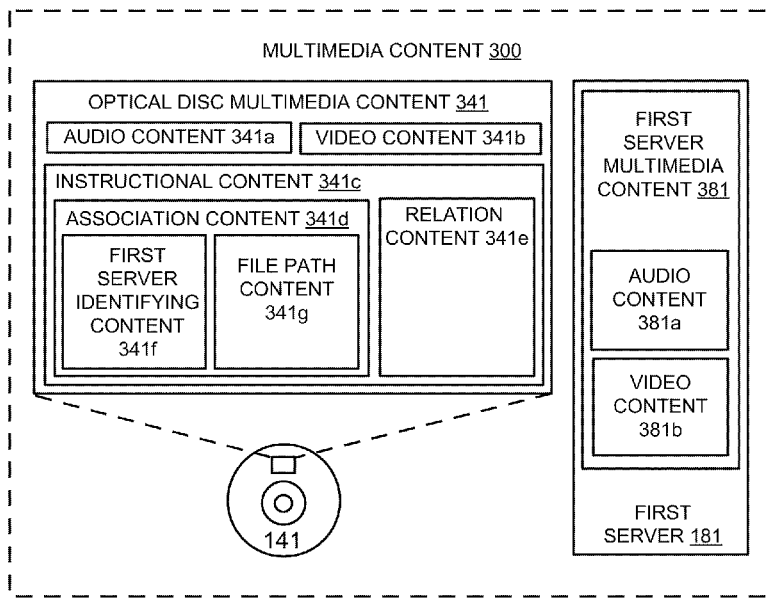
FIG. 3A illustrates a diagram of a first embodiment of a multimedia content.

FIG. 3A illustrates a nonlimiting example of a multimedia content 300, which includes an optical disc multimedia content 341 and a first server multimedia content 381. The first server multimedia content 381 is stored on a first server 181 and is in the form of a server multimedia bitstream. Also, in the nonlimiting example shown in FIG. 3, the first server multimedia content 381 includes a first server audio content 381$a$ and a first server video content 381$b$.

Figure 3B:
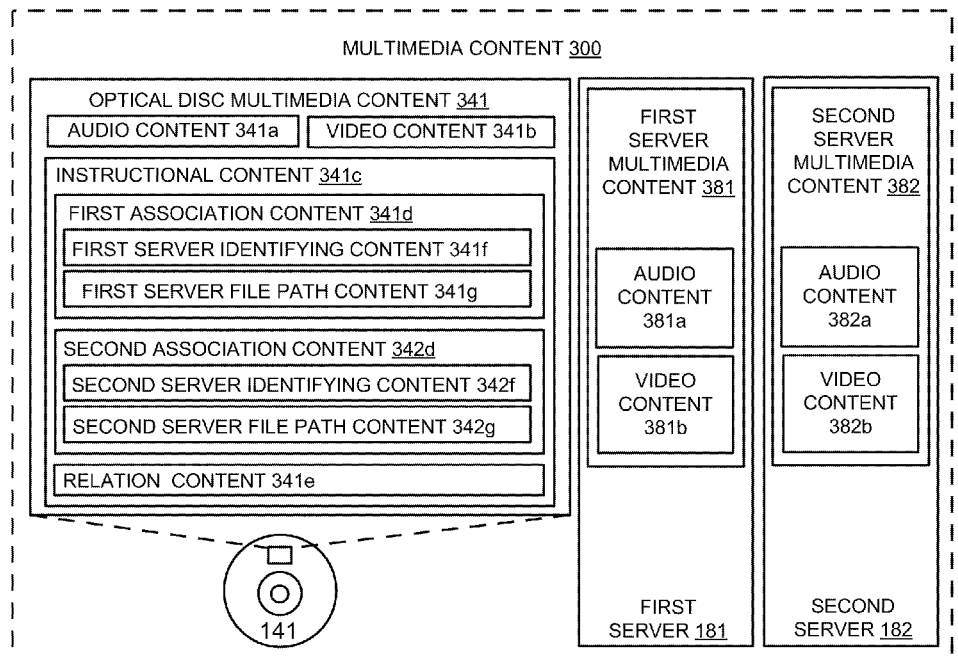
FIG. 3B illustrates a diagram of a second embodiment of a multimedia content.

FIG. 3B illustrates another nonlimiting example of a multimedia content 300. In addition to the optical disc multimedia content 341 and the first server multimedia content 381 illustrated in FIG. 3A, the multimedia content 300 illustrated in FIG. 3B also includes a second server multimedia content 382. The second server multimedia content 382 includes a second server audio content 382$a$ and a second server video content 382$b$. Also, the second server multimedia content 382 can be stored on a second server 182 as illustrated in FIG. 2.

Referring to FIGS. 3A and 3B, the optical disc multimedia content 341, which is also included in the multimedia content 300, is burned or embedded on the optical disc 141 in the form of an optical disc multimedia bitstream. In the embodiments illustrated in FIGS. 3A and 3B, the optical disc multimedia content 341 includes an optical disc audio content 341$a$, an optical disc video content 341$b$, and an instructional content 341$c$.

The instructional content 341$c$ includes a first association content 341$d$ and a relation content 341$e$. The relation content 341$e$ includes a relation between at least a portion of the optical disc multimedia content 341 and at least a portion of the first server multimedia content 381 to define a sequence of the playback, a Picture-in-Picture (PiP) effect to superimpose a portion of content on another portion of the content, or a transition effect during the playback. For example, the sequence of the playback of the contents may be defined according to a timeline or storyboard, which will be discussed later with respect to FIGS. 9A and 9B. Similarly, PiP effect or the transition effect may be defined by a user using the same user interface 700 shown in FIGS. 9A and 9B.

The first association content 341$d$ includes a first server identifying content 341$f$ and a file path content 341$g$. The first server identifying content 341$f$ identifies the first server 181, and the first server file path content 341$g$ indicates the location of at least a portion of the first server multimedia content 381 on the first server 181. In some embodiments, the first server file path content 341$g$ is the direct location of the first server multimedia content 381 on the first server 181. In some embodiments, the first server file path content 341$g$ is a program with the parameters to redirect to the exact location of the first server multimedia content 381 on the first server 181. Also, in some embodiments, the first association content 341$d$ may include an association as a connection string or URL according to a communication protocol, such as www-.firstserver.com/media/clip2.mpeg. Further, the first association content 341$d$ also includes parameters for the transmission of the first server multimedia content 381, and/or a destination location of a local storage device.

The instructional content 341$c$ in the nonlimiting example of multimedia content 300 illustrated in FIG. 3B also includes a second association content 342$d$. The second association content 342$d$ includes a second server identifying content 342$f$ and a second server file path content 342$g$. For example, in some embodiments, the second association content 342$d$ may include a URL such as www.secondserver.com/clip3.mpeg. In some embodiments, the second association content 342$d$ also includes a fingerprint of the second server multimedia content 382, parameters for the transmission, and/or a destination location of a local storage device.

Additionally, in some embodiments, the instructional content 341$c$ includes a server communication protocol, a code and/or a script (e.g., Blu-Ray Disc Java (BD-J) code, HD DVD interactivity layer (iHD or HDi) code), and/or ancillary data. Further, in some embodiments, the server protocol, code and/or script defines or controls a configuration of the first server 181 or a transmitting behavior of the first server 181. Likewise, in some embodiments, the server protocol, code, and/or script defines or controls a configuration of the second server 182 or a transmitting behavior of the second server 182.

In some embodiments, the instructional content 341$c$ also controls the effects or the format for playback, such as, for example, fade-in, fade-out, PiP, watermarks, attributes and/or other visual effects. For example, the instructional content 341$c$ includes instructions executable by the first server 181 that case the first server 181 to convert at least a portion of the first server multimedia content 381 stored on the first server 181 for playback. In some embodiments, the conversion of the at least a portion of the first server multimedia content 381 depends on a transmitting condition. Further, in some embodiments, the instructional content 341$c$ controls the configuration in the server communication protocol, the settings of the first portion of the content from the first server, the type of transmitting (streaming, pre-downloading, or downloading the other portions according to the states in playback), and playback sequence/effects. For example, the instructional content 341$c$ describes the corresponding clip and actions to change the color/contrast to be applied to the clip.

In some embodiments, the server protocol, code and/or script defines or controls a configuration of the first server 181 or a transmitting behavior of the first server 181. Likewise, in some embodiments, the server protocol, code, and/or script defines or controls a configuration of the second server 182 or a transmitting behavior of the second server 182. The instructional content 341c, in some embodiments, controls the effects or the format for playback, such as, for example, fade-in, fade-out, watermarks, attributes and/or other visual effects.

Also, in other embodiments, the optical disc multimedia content 341 includes more or less content than depicted in the embodiment illustrated in FIGS. 3A and 3B. For example, the optical disc multimedia content 341 also includes one or more of a variety of other content as well such as metadata content (e.g., subtitles, text, clip attributes), and interactive content (e.g. a menu).

Figure 4A:
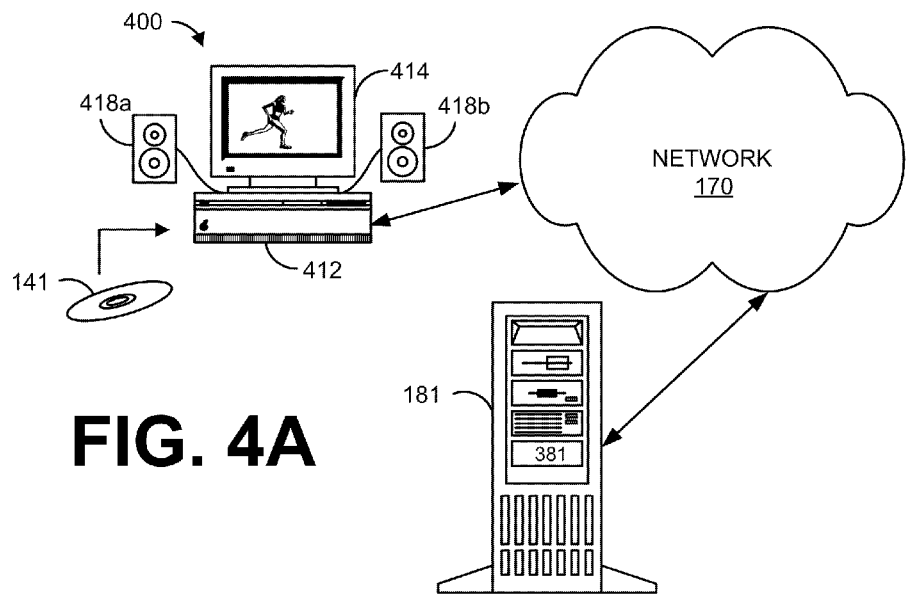
FIG. 4A illustrates a diagram of a first embodiment of a video playback device.

FIG. 4A illustrates a nonlimiting example of a video playback device 400. The video playback device 400 includes an optical disc player 412, speakers 418a, 418b, and a display 414. The display 414 may include a computer monitor, a plasma screen, a liquid crystal display (LCD) screen, and/or DTV/HDTV screen, for example. The optical disc player 412 of the video playback device 400 is coupled to, and/or is in communication with, the first server 181 over the network 170. In some embodiments, such as in the nonlimiting example illustrated in FIG. 4B, the video playback device 400 is also coupled to, and/or in communication with, a second server 182 over the network 170. The optical disc player 412 illustrated in FIGS. 4A and 4B may be a CD player, a DVD player, BD player, BD-Live disc player, an HD DVD player, iHD player, or one of a variety of other optical disc players. In some embodiments, the optical disc player 412 includes a virtual file system, at least one gigabyte of local memory storage and an Internet connection capability.

The optical disc player 412 reads the optical disc multimedia content 341 embedded or burned onto the optical disc 141. The video playback device 400 then displays the optical disc video content 341b of the optical disc multimedia content 341 on the display 414 and/or play the optical disc audio content 341a on the speakers 418a, 418b. Further, the video playback device 400 reads the instructional content 341c including the first server identifying content 341f. When the optical disc player 412 executes the instructional content 341c, the optical disc player 412 reads the first server multimedia content 381 from the first server 181 over the network 170.

Also, in some embodiments, the instructional content 341c includes instructions for controlling the optical disc player 412 to build a connection with the first server 181 based on the first association content 341d. As discussed above with respect to FIGS. 3A and 3B, the first association content 341d includes a first server identifying content 341f and a first server file path content 341g. The first server file path content 341g corresponds to the file path (i.e. location) of at least a portion of the first server multimedia content 381 stored on the first server 181. In some embodiments, first association content 341d may be a connection string or URL according to a communications protocol. An example of the connection string or URL is "http://www.firstserver.com/media/song1.mp3" according to a hypertext transfer protocol (HTTP). Further, the instructions control the optical disc player 412 to retrieve the first server multimedia content 381 from the first server 181 via the connection. Also, the instructional content 341c includes instructions that define the transmitting behavior for the first server multimedia content 381 from the first server 181 over the built connection.

A nonlimiting example of the instructions included the instructional content 341c in BD-J are shown below:

```
import java.io.BufferedInputStream;
import java.io.FileOutputStream;
import java.net.HttpURLConnection;
import java.net.URL;
public class HttpSample {
  /**
   * @param args
   */
  public static void main(String[ ] args) throws Exception {
    URL url = new
    URL("http://www.firstserver.com/media/song03.mp3");
    HttpURLConnection conn = (HttpURLConnection)
    url.openConnection( );
    conn.setRequestMethod("GET");
    conn.setDoInput(true);
    conn.setUseCaches(false);
    System.out.println("Content length = " + conn.getContentLength( ));
    java.io.BufferedInputStream in = new BufferedInputStream(conn
        .getInputStream( ));
    FileOutputStream out = new FileOutputStream("NTU_Song.mp3");
    byte[ ] buf = new byte[1024];
    int read = 0;
    while (−1 != (read = in.read(buf))) {
      out.write(buf, 0, read);
    }
    out.close( );
    in.close( );
    conn.disconnect( );
    System.out.println("Done!");
  }
}
```

Figure 4B:
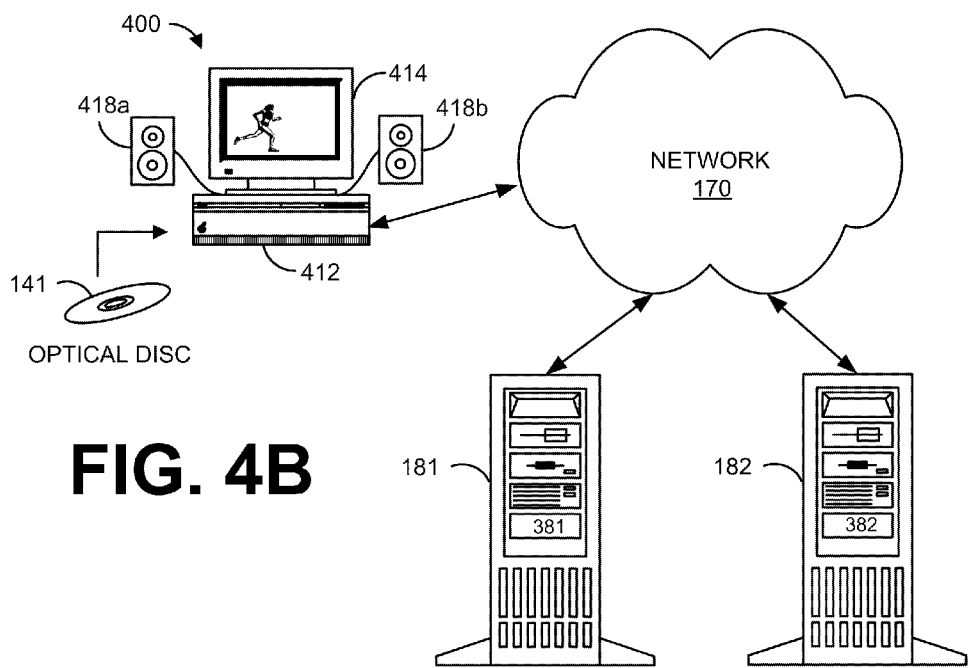
FIG. 4B illustrates a diagram of a second embodiment of a video playback device.

In the nonlimiting example illustrated in FIG. 4B, the instructional content 341c also includes a second server identifying content 342f. The second server identifying content 342f identifies the second server 182. When the optical disc player 412 executes the instructional content 341c of the multimedia content 300 illustrated in FIG. 3B, the optical disc player 412 downloads at least a portion of the first server multimedia content 381 over the network 170 from the first server 181 and/or at least a portion of the second server multimedia content 382 from the second server 182.

Figure 5:
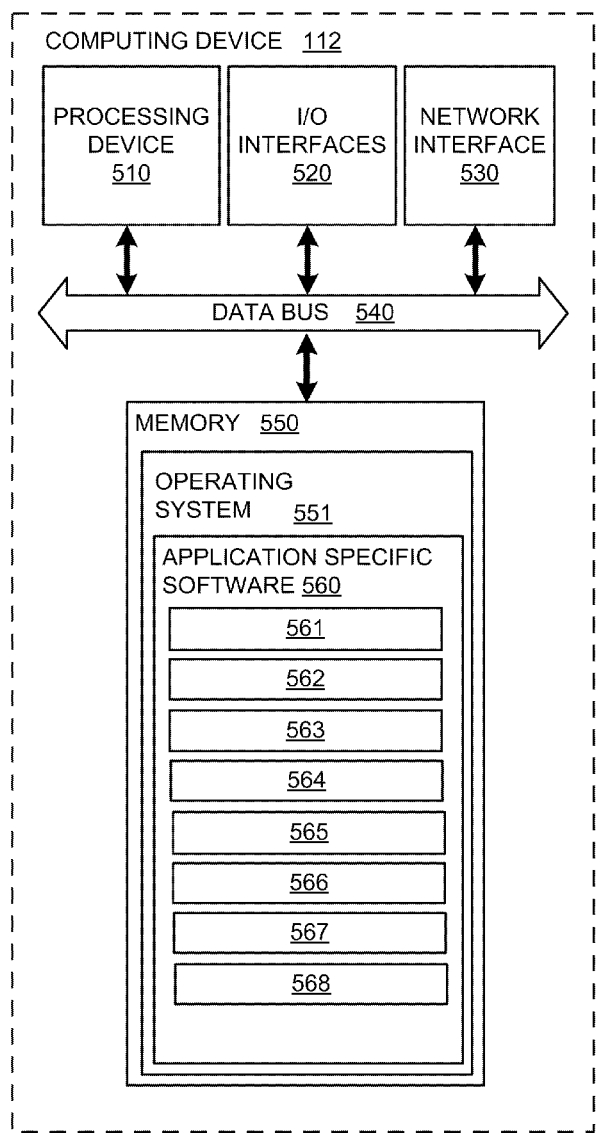
FIG. 5 illustrates a diagram of an embodiment of a computing device.

FIG. 5 illustrates an embodiment, among others, of a computing device 112. The computing device 112 includes a processing device 510, I/O interfaces 520, a network interface 530, a data bus 540 and a memory 550. The processing device 510 is configured to execute software stored in an operating system 551, including an application specific software 560. The processing device 510 includes a custom-made or commercially-available processor, a central processing unit (CPU), an auxiliary processor among several processors, a semiconductor based microprocessor (in the form of a microchip or chip set), a macroprocessor, and/or generally any device for executing software instructions. When the computing device 112 is in operation, the processing device 510 executes the application specific software 560, communicates data to and from the memory 550 over the data bus 540, and generally controls the operation of the computing device 112 pursuant to the application specific software 560.

The I/O interfaces 520 provide any number of interfaces for the input to and output of data from the computing device 112. For example, referring to FIGS. 1 and 2, data is sent to and/or from a user input device 116, an audio recorder 160, a video recorder 120, and/or an optical disc drive 140. Data may also be sent to and/or from the computing device 112 to and/or from other devices such as, for example, other audio recorders, other video recorders, other optical disc drives, printers, digital image cameras, speakers, personal digital assistants (PDAs), cellular phones, scanners, microphones, a mouse, a touchscreen or one or more of variety of other devices.

The network interface 530 includes various components used to transmit and/or receive data over the network 170. Also, the network interface 530 includes a device that communicates both input data and output data, for example, a modulator/demodulator (e.g., a modem), wireless (e.g., radio frequency (RF)) transceiver, a telephonic interface, a bridge, a router, network card, etc.)

The memory 550 may include any one of a combination of volatile memory elements (e.g., random-access memory (RAM), such as DRAM, and SRAM, etc.)) and/or nonvolatile memory elements (e.g., read-only memory (ROM), hard drive, tape, etc.). The memory 550 includes the operating system 551 as well as one or more applications, emulation systems, or emulated applications for any of a variety of operating systems and/or emulated hardware platforms, emulated operating systems, etc. For example, the applications stored in the operating system 551 include the application specific program 560, which may include instructions for producing multimedia content. One of ordinary skill in the art will appreciate that the memory 550 can, and typically will, comprise other components, which have been omitted for purposes of brevity.

In some embodiments, the application specific software 560 is stored on a variety of computer-readable media for use by, or in connection with, a variety of computer-related systems or methods. In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

As in the nonlimiting embodiment illustrated in FIG. 5, the application specific software 560 includes an importation module 561, which is configured to import a source content from a source in communication with the computing device 112. The imported source content includes audio content, video content, audiovisual content and/or one or more of a variety of other source content. In some embodiments, the imported source content includes a first portion and a second portion of imported source content. The importation module 561 is configured to import the source content from one or more of a variety of sources. For example, the source content is imported from the memory 550 and/or a device in communication with the computing device 112. With respect to the nonlimiting embodiment illustrated in FIG. 1, the source content is imported from the audio recorder 160, the video recorder 120, the optical disc reader 130, the memory 550, the first server 181 via the network 170, and/or the second server 182 via the network 170.

Also, as another nonlimiting example described with respect to FIG. 1, a first audio clip and a second audio clip is imported from the audio recorder 160; a first audiovisual clip, a metadata content and an interactive content is imported from a first server 181; a second audiovisual clip is imported from the video recorder 120; a third audiovisual clip is imported from the optical disc 141 read by the optical disc drive 140; and a fourth audiovisual clip is imported from the memory 550 in the computing device 112 of the personal computer 110.

A selection receiving module 562 is also included in the application specific software 560 in the embodiment illustrated in FIG. 5. The selection receiving module 562 is configured to receive a selection. In some embodiments, the selection receiving module 562 receives a selection of at least a portion of the imported source content. For example, the selection receiving module 562 is configured to receive a selection of an imported clip. A user may select the imported clip for publishing on a first server 181, and/or the selection of the imported clip may be based on a predefined criteria. With regard the nonlimiting example discussed above, the selection receiving module 562 is configured to receive a selection from a user of the first clip imported from the video recorder 120. Hence, the first clip would be a selected clip. In some embodiments, more than one clip is selected or all imported clips are selected. Likewise, more than one server may be selected as well.

Still, in some embodiments, the selection receiving module 562 is configured to receive a selection of a first portion of the imported source content and a selection of a second portion of the imported source content. The first portion of the imported source content may include audio content, video content, audiovisual content, instructional content, metadata content, interactive content, and/or one of a variety of other source content. Likewise, the second portion of the imported source content may include audio content, video content, instructional content, metadata content, interactive content, and/or one of a variety of other source content.

Further, in some embodiments, the selection receiving module 562 is configured to receive a selection of a first server 181, a second server 182, and/or one of a variety of other items. In some embodiments, the first server 181 is selected for storing and/or publishing a first server multimedia content 381. The first server multimedia content 381 includes, for example, a first portion of the imported source content.

In some embodiments, both a selection of imported source content and the first server 181 are received by the selection receiving module 562. For example, the selection receiving module 562 is configured to receive a selection of an imported clip selected for publishing on the first server 181. In some embodiments, the first server 181 also is selected by a user to publish or store the selected imported clip. As another nonlimiting example, the selection receiving module 562 is configured to receive a selection of a first portion of an imported source content and a selection of a first server 181 for storing the selected first portion of an imported source content as a first server multimedia content 381.

The application specific software 560 in the embodiment illustrated in FIG. 5 also includes a generation module 563. The generation module 563 is configured to generate an instructional content 341c. The instructional content 341c is discussed in detail above regarding FIGS. 3A and 3B.

As a nonlimiting example, the generated instructional content 341c includes a first server identifying content 341f. The first server identifying content 341f identifies the first server 181. The generated instructional content 341c also includes a first association content 341d. The first association content 341d includes an association between the first portion of the imported source content and a second portion of the imported source content. In some embodiments, the first association content 341d also includes an association between the first server 181 and the first portion of the imported source content. Also, in some embodiments, the first association content 341d also includes an association between the second server 182 and a third portion of the imported source content.

In addition, in some embodiments, the instructional content 341c further comprises instructions executable by the first server 181 that cause the first server 181 to convert the first server multimedia content 381 (e.g., the first portion of the imported source content) stored on the first server 181 for playback. Also, the converting of the first portion of the imported source content depends on a transmitting condition such as a bit rate, for example.

The application specific software 560 in the embodiment illustrated in FIG. 5 also includes an exportation module 564. The exportation module 564 is configured to export the first portion of the imported source content or selected clips to the first server 181 for storage as a first server multimedia content 381. In some embodiments, the content is exported to more than one server to provide redundancy. Also, in some embodiments, a third portion of an imported source content is exported to the second server 182.

Also, in the embodiment illustrated in FIG. 5, the application specific software 560 further includes a burn module 565. The burn module 565 is configured to cause an optical disc drive 140 to burn or embed the second portion of the imported source content or the nonselected clips and the instructional content 341c onto the optical disc 141 as an optical disc multimedia content 341. The optical disc multimedia content 341 includes an optical disc audio content 341a, an optical disc video content 341b, an optical disc metadata content, an optical disc interactive content, and/or one of a variety of other content.

In some embodiments, such as the nonlimiting embodiment illustrated in FIG. 5, the application specific software 560 includes a conversion module 566. The conversion module 566 is configured to convert compressed data into uncompressed data as well as to convert uncompressed data into compressed data. For example, the conversion module 566 is configured to convert the imported source content into uncompressed data. The conversion module 566 is also configured to convert the first portion of the imported source content, after the imported source content has been decompressed, into a server multimedia bitstream, which is compressed data. Also, in some embodiments, the conversion module 566 is configured to convert the third portion of the imported source content into a server multimedia bitstream.

Additionally, the conversion module 566 is configured to convert the second portion of the imported source content, after the imported source content has been decompressed, into an optical disc multimedia bitstream, which is compressed data. The compressed data is in a format suitable for the optical disc 141, such as H.264, MPEG-2, or VC-1.

The conversion module 566 is configured to convert the content into uncompressed data before the content is edited. Similarly, the conversion module 566 is configured to convert the uncompressed data to compressed data before the content is burned and/or exported in the exportation module 564 and/or burn module 565.

A multimedia stream is, for example, any type of file, data stream, or digital broadcast representing any combination of audio, video, data, text, pictures, etc. Also, the multimedia stream is in the format of an MPEG-1 bitstream, an MPEG-2 bitstream, an MPEG-4 bitstream, an H.264 bitstream, a 3GPP bitstream, a 3GPP-2 bitstream, SD-Video bitstream, a HD-Video bitstream, a DVD multimedia bitstream, a VCD multimedia bitstream, a HD-DVD multimedia bitstream, a DTV/HDTV multimedia bitstream, an AVI bitstream, a WAV bitstream, a DV bitstream, a QT file, a CDA bitstream, an MP3 bitstream, an MP2 bitstream, WMA bitstream, a WMV bitstream, an ASF bitstream, or any number of other popular digital multimedia formats. The above exemplary data streams are merely examples, and it is intended that the system cover any type of multimedia bitstream in its broadest sense.

In some embodiments, such as the embodiment illustrated in FIG. 5, the application specific software 560 includes a trigger receiving module 567. The trigger receiving module 567 is configured to receive a trigger. In one embodiment, trigger is the pressing of a publish button 717 by a user using the user interface 700, which will be discussed further with respect to the user interface module 568 below. The trigger indicates that the exporting and/or the burning of content should commence. In response to receiving the trigger, the trigger receiving module 567 is configured to cause the exportation module 564 to export the first portion of the imported source content or selected clips to the first server 181 as a first server multimedia content 381 and/or cause the burn module 565 to cause the optical disc drive 140 to burn or embed the instructional content 341c and the first portion of the imported source content or nonselected clips onto the optical disc 141 as an optical disc multimedia content 341.

Figure 7:
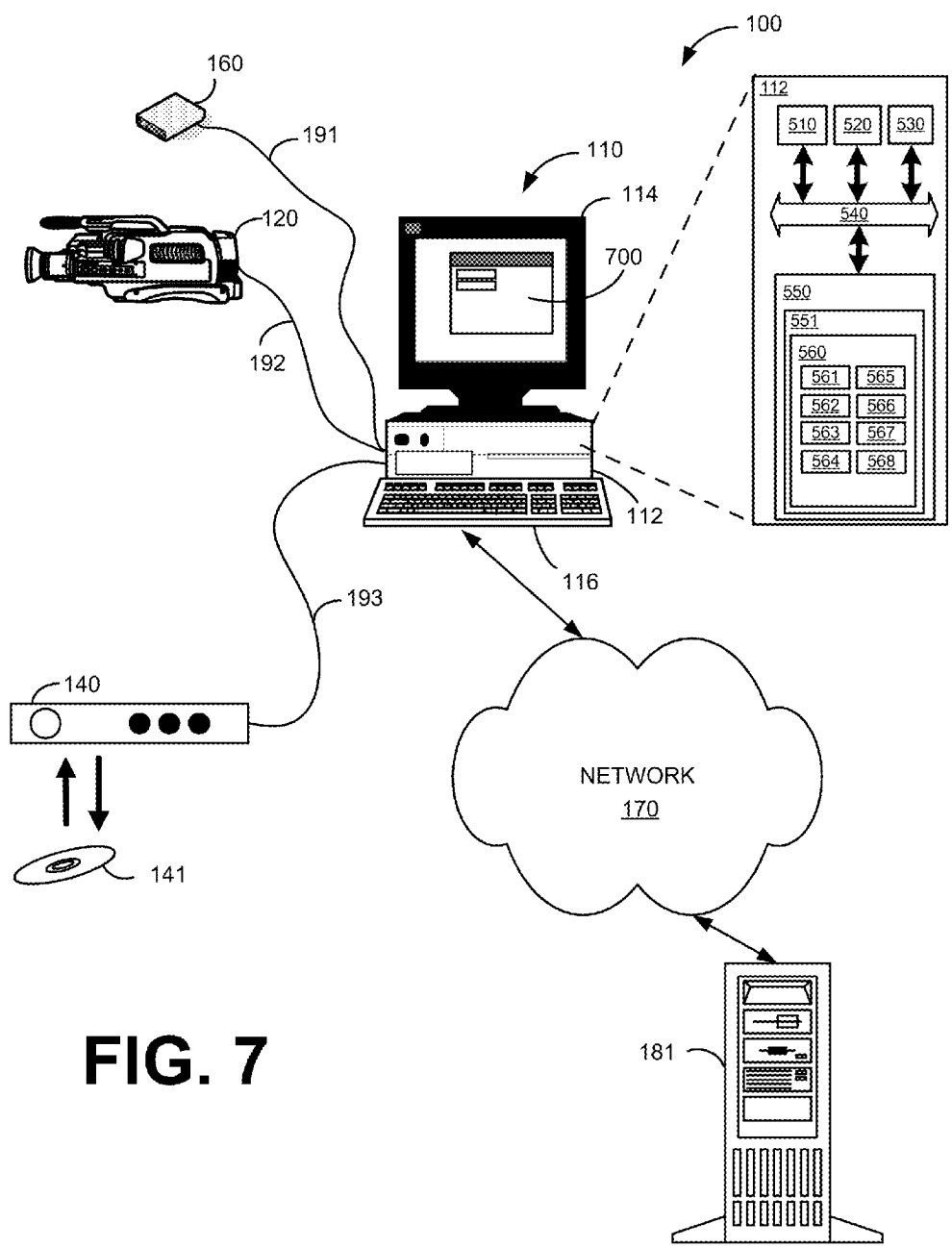
FIG. 7 illustrates a diagram of an embodiment of a system for producing multimedia content displaying a user interface.

In the embodiment illustrated in FIG. 5, the application specific software 560 further includes a user interface module 568. The user interface module 568 is configured to display a user interface 700 on the display 114 of the personal computer 110 such as illustrated in FIG. 7. Nonlimiting examples of the user interface 700 are displayed in FIGS. 7, 8, 9A, 9B, 10, 11A, 11B, 12, 13, 14A, and 15A and will be discussed in further detail below.

Figure 6:
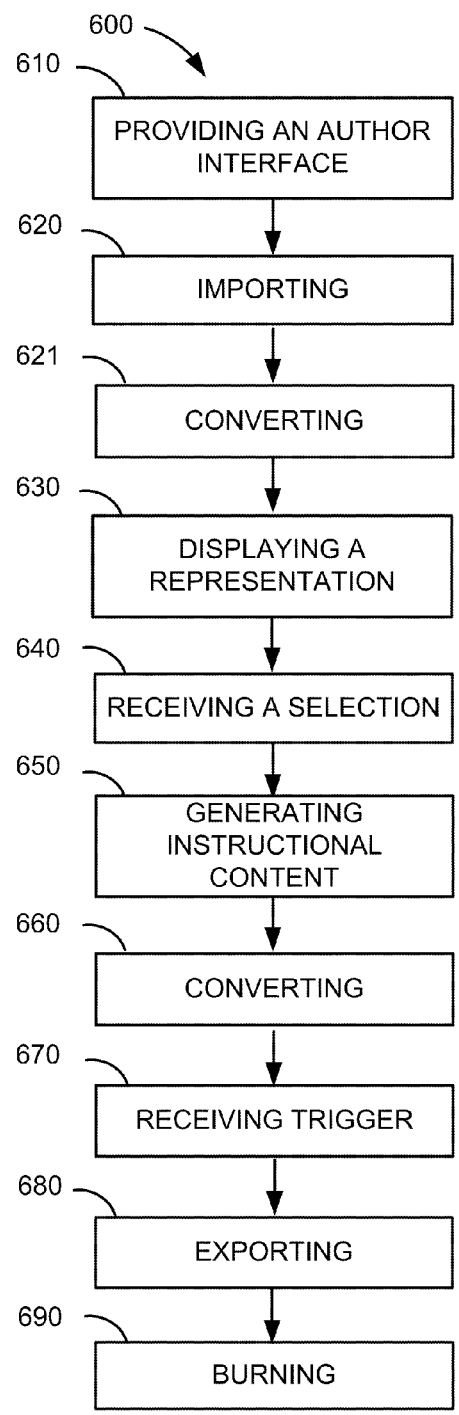
FIG. 6 illustrates a flow chart of an embodiment of a method for producing multimedia content.

FIG. 6 illustrates a nonlimiting example of a method 600 for producing multimedia content 300 including blocks 610, 620, 621, 630, 640, 650, 660, 670, 680, and/or 690. In block 610, a user interface 700 is provided. For example, a user interface 700 such as the ones depicted in the nonlimiting examples illustrated in FIGS. 7, 8, 9A, 9B, 10, 11A, 11B, 12, 13, 14A, and 15A is provided. The user interface 700 illustrated in FIG. 8 includes a menu 710 and a workspace 720. The menu 710 includes a variety of buttons such as an import button 711, an edit button 712, an organize button 713, an insert button 714, a select destination button 715, a preview button 716, a publish button 717. In other embodiments, the menu 710 includes other buttons or fewer buttons than those illustrated. The provided user interface 700 is displayed on the display 114 of the personal computer 110 such as is illustrated in FIG. 7.

In block 620, a source content is imported. The source content may include one or more clips. In some embodiments, the source content may include video content, audio content, audiovisual content, instructional content, interactive content, metadata content, and/or one of a variety of other content. The source content is imported from a variety of sources such as devices in communication with the computing device 112.

As a nonlimiting example discussed with respect to FIG. 7, a first audio clip is imported from the audio recorder 160, a second audio clip is imported from the first server 181, a first clip is imported from the video recorder 120, a second clip is imported from the optical disc 131 read by the optical disc reader 130, and a third clip is imported from the memory 550 in the computing device 112 of the personal computer 110.

In some embodiments, the source content is imported according to directives received from a user on the provided user interface 700. As a nonlimiting example discussed with respect to FIGS. 7 and 8, a user may choose the import button 711 and cause clip 1, clip 2, clip 3, and/or clip 4 to imported. Clip 1 is imported over the network 170 from the first server 181; clip 2 is imported from the video recorder 120; clip 3 and clip 4 is imported from the memory 550 of the computing device 112.

In block 621, the imported source content is converted into uncompressed data when the imported source content is compressed data. For example, the imported source content may be in an AVI format or another video/audio compression format. The imported source content is converted into uncompressed data so that the imported source content is in a form appropriate for editing.

Figure 8:
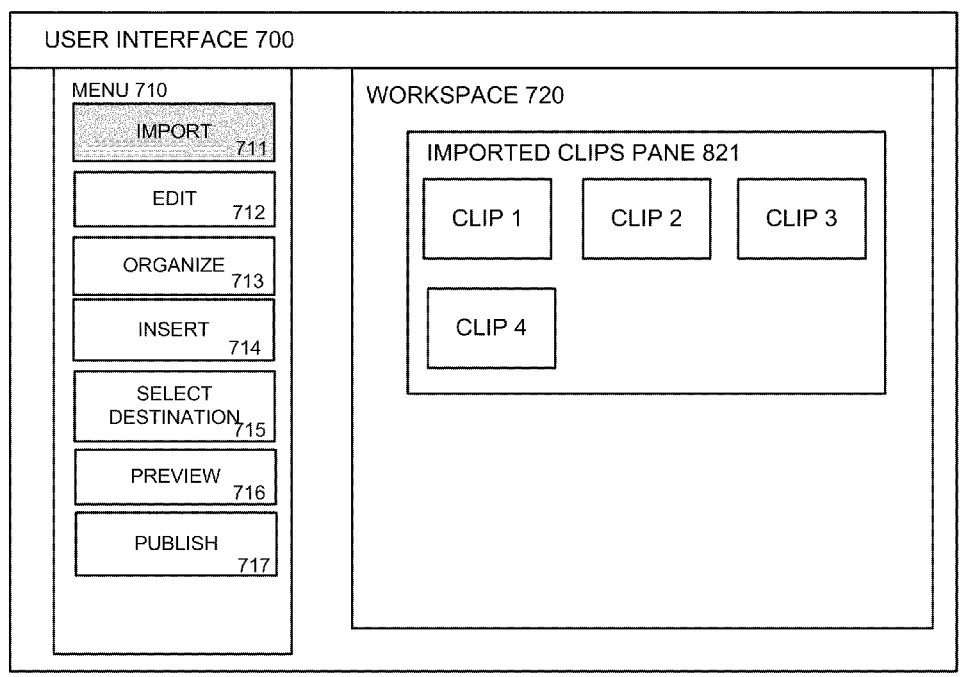
FIG. 8 illustrates an embodiment of the user interface displaying imported source content.

In block 630, a representation is displayed. The displayed representation is associated with the imported source content. In some embodiments, a representation associated with the imported source content is displayed in the user interface 700 as shown in FIG. 8. The representation, for example, may include a list of file names, clip names, or other names corresponding to the source content. Also, in some embodiments, the representation includes a collection of thumbnails corresponding to different portions of the source content. For example, FIG. 8 illustrates a nonlimiting example of the representation as an imported clips pane 821 on the user interface 700 including a clip 1, a clip 2, a clip 3, and a clip 4.

Figure 9A:
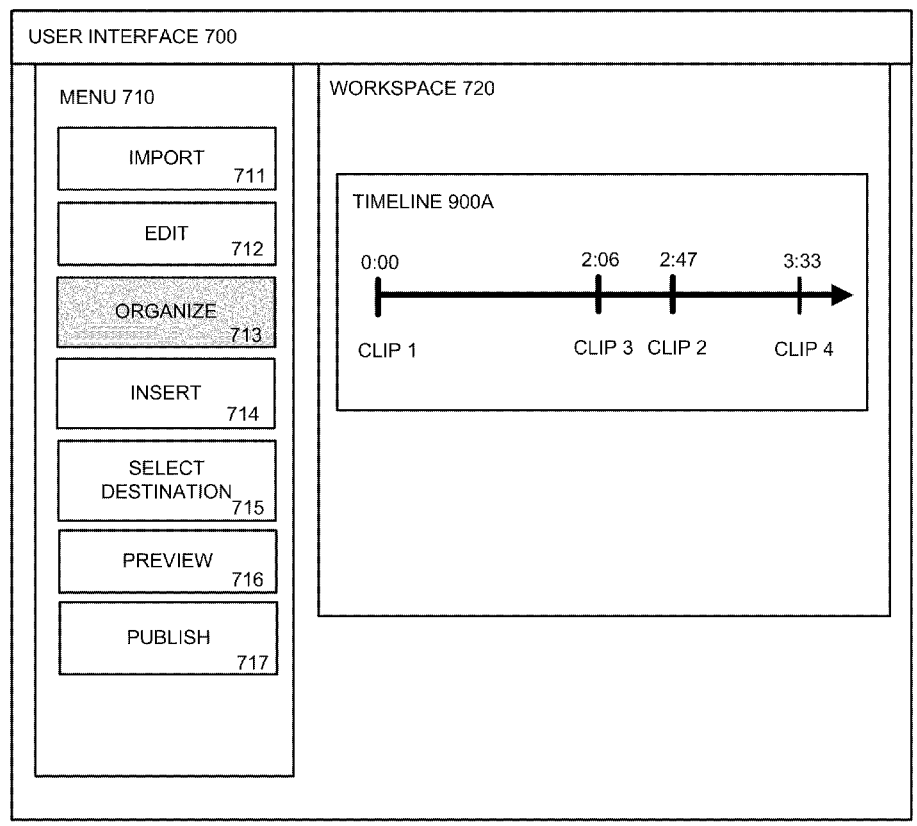
FIG. 9A illustrates a first embodiment of the user interface displaying a representation of the multimedia content.
Figure 9B:
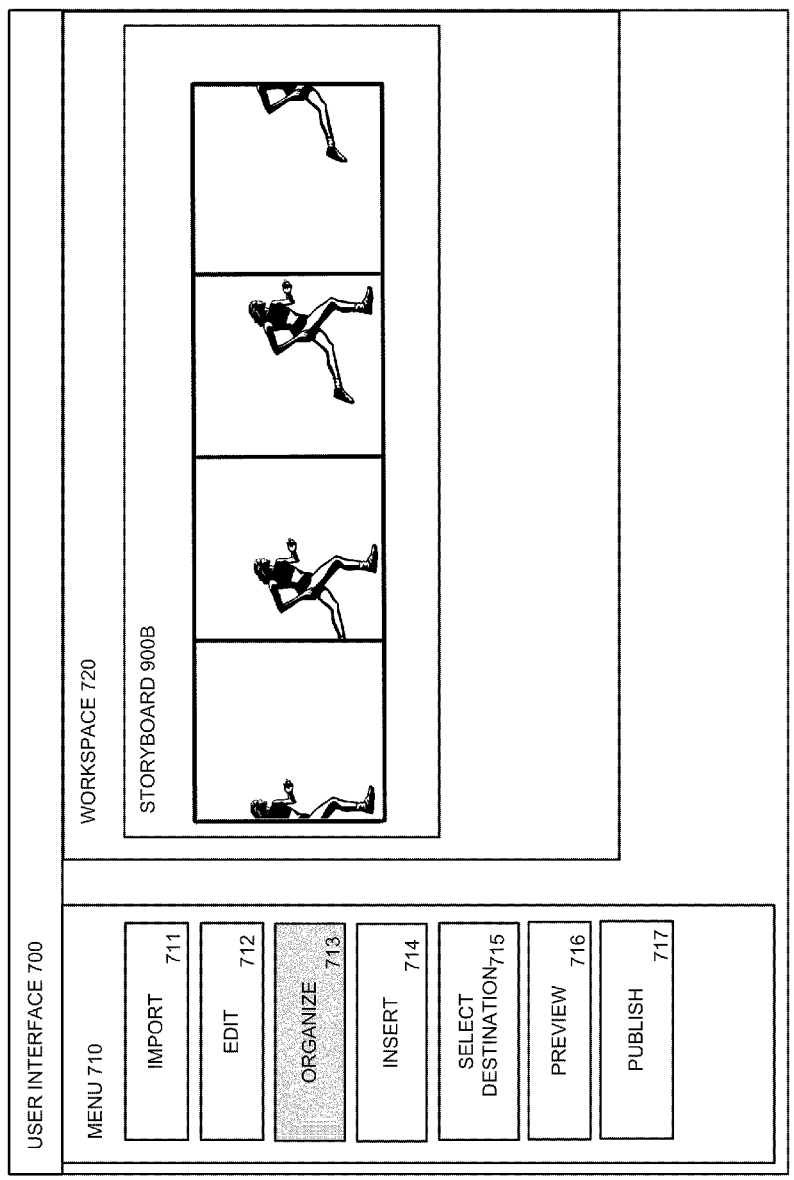
FIG. 9B illustrates a second embodiment of the user interface displaying a representation of the multimedia content.

In some embodiments, the displayed representation is in the form of a timeline 900A such as is illustrated in FIG. 9A and/or a storyboard 900B such as is illustrated in FIG. 9B. A user may organize at least a portion of the imported source content using the timeline 900A and/or storyboard 900B represented in the user interface 700. For example, the user may arrange imported clips in a particular order and that arrangement is represented on the timeline 900A and/or storyboard 900B. The timeline 900A includes clip names and times corresponding to a sequence of the clips and their duration. The storyboard 900B includes thumbnails corresponding to a sequence of the clips. In some embodiments, the displayed representation also includes a clip name or thumbnail corresponding to a selected clip or first portion of the imported source content. The selected clip or first portion of the imported source content is also identified in the displayed representation as being associated with the first server 181.

The relation content 341e, described with respect to FIGS. 3A and 3B, is defined based on the arrangement of the thumbnails on the storyboard 900B or the clip names on the timeline 900A, and the relation content 341e is generated when the instructional content 341c is generated in block 650. In some embodiments, the relation content 341e includes a relation between the first portion of the imported source content and a second portion of the imported source content. Also, in some embodiments, the relation content 341e also includes a relation between the first portion of the imported source content, the second portion of the imported source content, and/or a third portion of the imported source content.

Figure 10A:
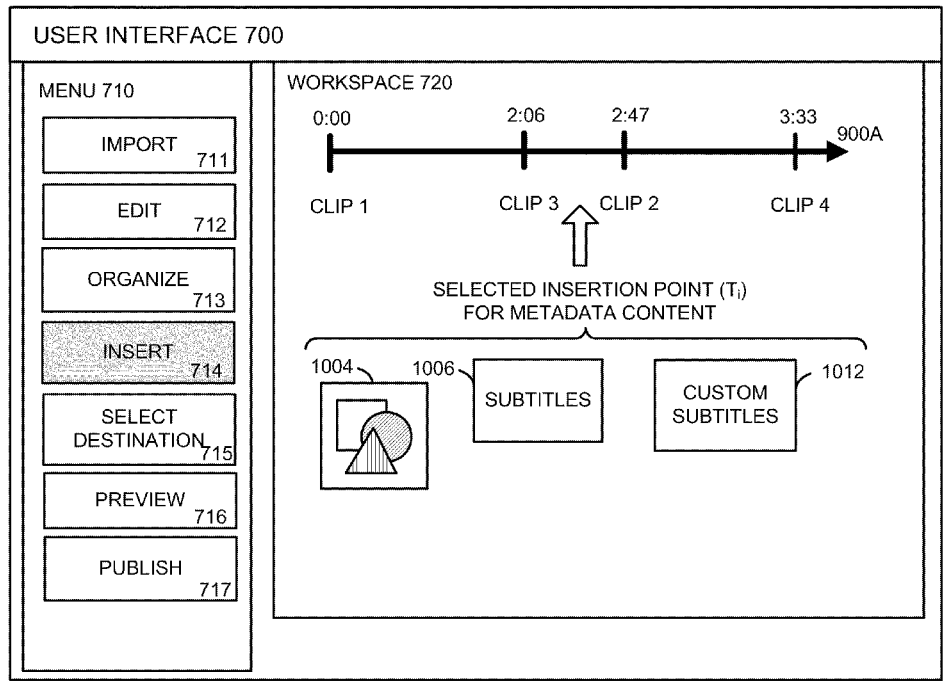
FIG. 10A illustrates an embodiment of the user interface displaying metadata content for insertion.
Figure 10B:
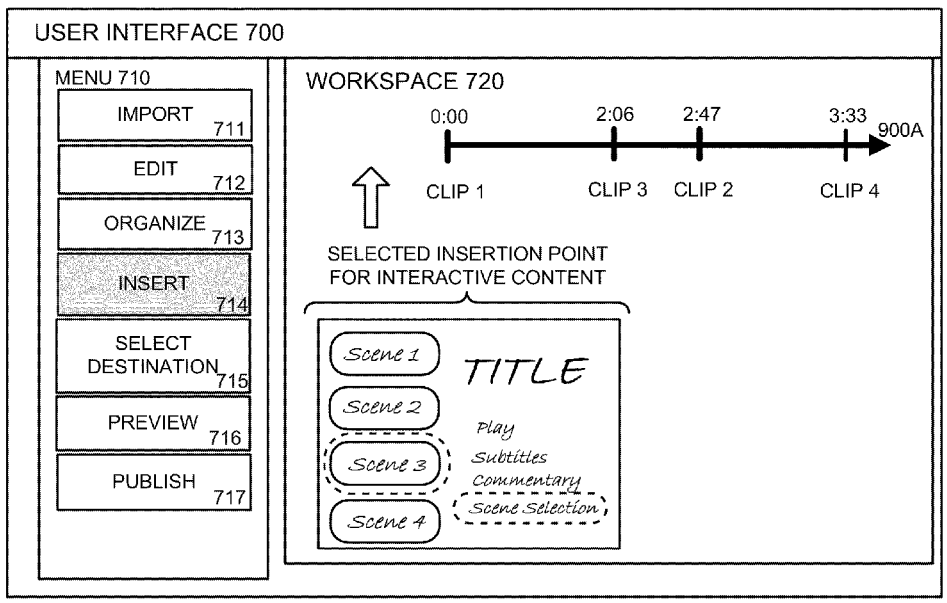
FIG. 10B illustrates an embodiment of the user interface displaying interactive content for insertion.

In some embodiments, content is inserted into or added to the displayed imported content. For example, as illustrated in FIGS. 10A and 10B, the content is added to the imported content shown in the displayed representation, which is in the form of a timeline 900A. In FIG. 10A, metadata content including shapes 1004, subtitles 1006, and custom subtitles 1012 are inserted in the displayed imported content. In FIG. 10B, interactive content in the form of a menu is inserted in the displayed imported content.

Figure 12:
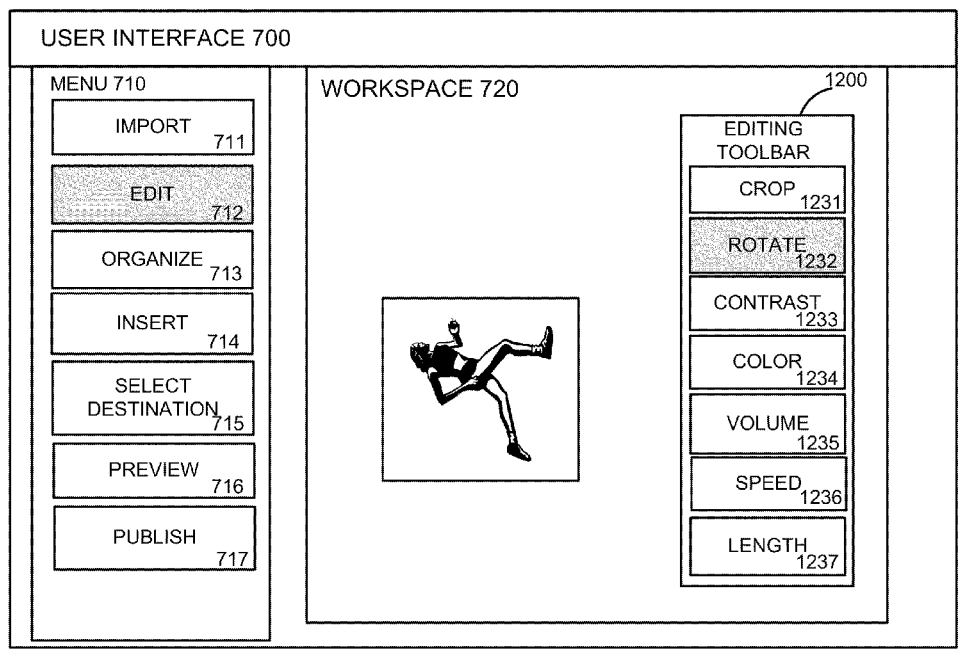
FIG. 12 illustrates an embodiment of the user interface displaying an edit of imported source content.
Figure 13:
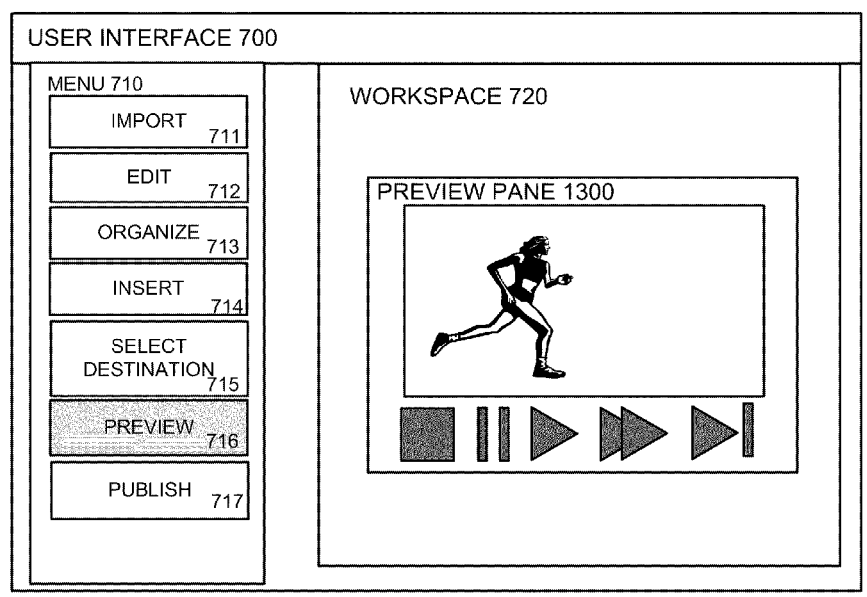
FIG. 13 illustrates an embodiment of the user interface displaying a preview of content.

In some embodiments, the imported source content is edited. For example, FIG. 12 illustrates a nonlimiting example of an imported clip, which has been rotated. Also, in the embodiment of a user interface 700 illustrated in FIG. 12, an editing toolbar 1200 is provided. The editing toolbar 1200 includes a crop button 1231, a rotate button 1232, a contrast button 1233, a color button 1234, a volume button 1235, a speed button 1236, and a length button 1237. Also, in some embodiments, content is previewed in a preview pane 1300 as illustrated in FIG. 13.

In block 640, a selection is received. A user may make a selection using the provided user interface 700. The received selection is of an imported clip, a first portion of the imported source content, a second portion of the imported source content, and/or one or more of a variety of other content. In some embodiments, the received selection is of a first server 181, a second server 182, and/or one or more of a variety of remote storage devices in communication with a computing device 112 as associated with the selected imported clip, the first portion of the imported source content, the second portion of the imported source content, and/or one or more of a variety of other selected content.

Figure 11:
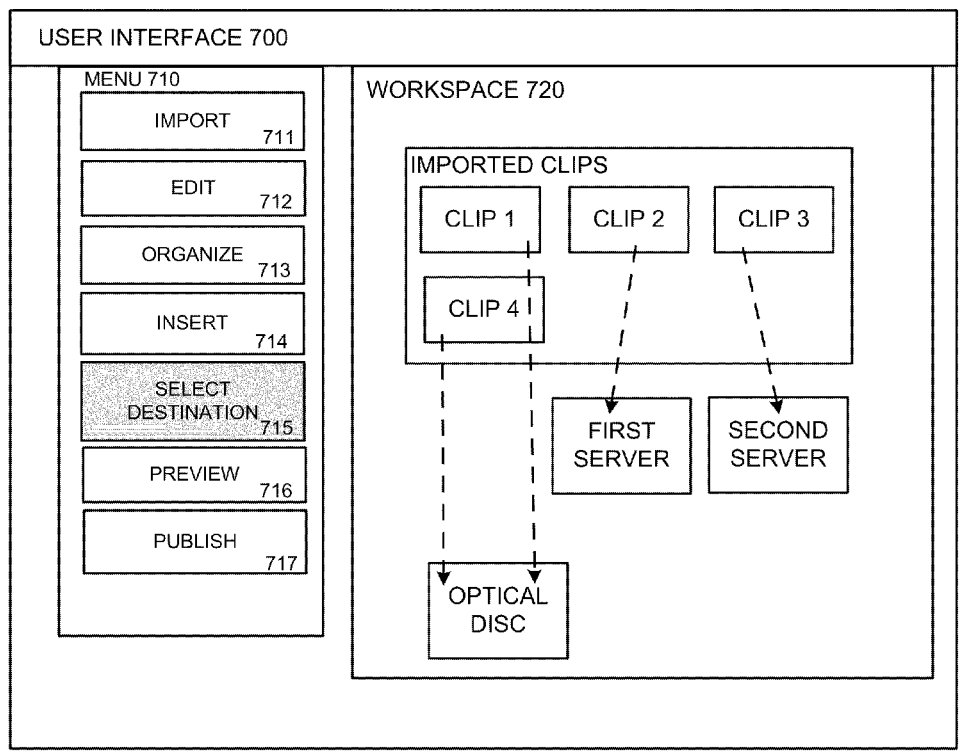
FIG. 11 illustrates an embodiment of the user interface displaying selected destinations for imported source content.

For example, in the nonlimiting example in FIG. 11, the user may select clip 1 and clip 4, which is an imported source content, to be associated with the optical disc 141 by dragging clip 1 and clip 4 to the optical disc box on the provided user interface 700. In other words, the user may select clip 1 and clip 4 to be the optical disc multimedia content 341. Also, the user may select clip 2 and clip 3, also an imported source content, to be associated with the first server 181 and the second server 182, respectively, by dragging clip 2 to the first server 181 and clip 3 to the second server 182. In other words, the user may select the clip 2 to be the first server multimedia content 381 and clip 3 to be the second server multimedia content 382. More specifically, the user may select clip 2 for publishing on the first server 181 and clip 3 for publishing on the second server 182.

In some embodiments, among others, a user may merely select clip 2 and clip 3 for publishing on the first server 181. Then, by default, the nonselected imported clip(s) and/or remaining imported clip(s): clip 1 and clip 2 is burned on the optical disc 141 whereas the selected clips is published on the first server 181 and/or the second server 182.

In some embodiments, among others, a selection of a first server 181 as associated with the first portion of the imported source content and/or selected clips is received. The first server 181 is selected to store the first portion of the imported source content and/or selected clips. In some embodiments, the selection of the first server 181 occurs before the second portion of an imported source content is burned to an optical disc 141.

In block 650, an instructional content 341c is generated. The instructional content 341c is discussed in detail above regarding FIGS. 3A and 3B. As a nonlimiting example, the instructional content 341c generated in block 650 includes a first association content 341d. The first association content 341d is generated based on the selection of the first server 181 as associated with the first portion of the imported source content and/or clips received in block 640. With reference to the example in FIG. 11, an association between clip 2 and the first server 181 is generated as well as an association between clip 3 and the second server 182. In addition, in some embodiments, the generated instructional content 341c also includes a second association content 342d. The second association content 342d is generated based on a selection of the second server 182 as associated with a third portion of the imported source content and/or clips received in block 640. The first association content 341d includes a first server identifying content 341f, which identifies the first server 181, and a first server file path content 341g.

When the instructional content 341c is generated, the relation content 341e is generated based on a PiP effect, a transition effect during the playback, and/or the sequence relationships between the clips or content defined by a user's manipulation or arrangement of the clips or content on the timeline 900A or storyboard 900B, illustrated in FIGS. 9A, 9B. In some embodiments, the relation content 341e includes a relation between the first portion of the imported source content, the second portion of the imported source content, and/or the third portion of the imported source content. In some embodiments, the relation content 341e includes a relation between selected clip(s) and nonselected clip(s).

After the instructional content 341c is burned on the optical disc 141 in block 690, the relation content 341e in the optical disc multimedia content 341 on the optical disc 141 will include a relation between at least a portion of the optical disc multimedia content 341, at least a portion of the first server multimedia content 381, and/or the second server multimedia content 382. The relation content 341e is discussed in further detail above with respect to FIGS. 3A and 3B.

In some embodiments, a template for the instructional content 341c is provided. The template may be in the form of a program or code. For example, in block 650, the instructional content 341c is generated by adding the file names of the selected audio visual clips or content and the address of the first server 181 to the provided template.

In block 660, the imported source content is converted and/or processed into a multimedia bitstream. For example, the imported source content may have been converted from being compressed data in an AVI format, or anther kind of the video/audio compression format to uncompressed data in block 621. In block 660, the imported source content that is uncompressed data will be compressed according to a specific format suitable for an optical disc 141, such as H.264, MPEG-2, or VC-1. The multimedia bitstream is in a compressed data format appropriate for exporting to a remote device such as the first server 181 and/or appropriate for burning onto an optical disc 141. The second portion of the imported source content or the nonselected clips are converted and/or processed before being burned or embedded onto the optical disc 141 as an optical disc multimedia content 341. The first portion of the imported source content and/or the selected clips are converted and/or processed before being exported to the first server 181 for storage as the first server multimedia content 381.

In block 670, a trigger is received. The trigger indicates that the exporting of the first portion of the imported source content or the selected clips to the first server 181 should begin. In some embodiments, the trigger also indicates that the burning of the second portion of the imported source content and the instructional content 341c onto the optical disc 141 should begin.

Figure 14A:
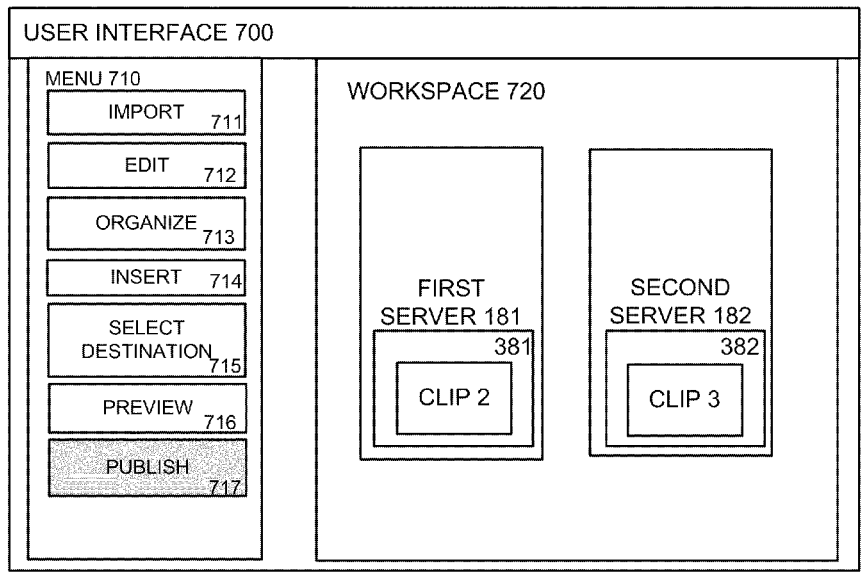
FIG. 14A illustrates an embodiment of the user interface displaying a first server multimedia content and a second server multimedia content to be exported to the first server and second server, respectively.
Figure 14B:
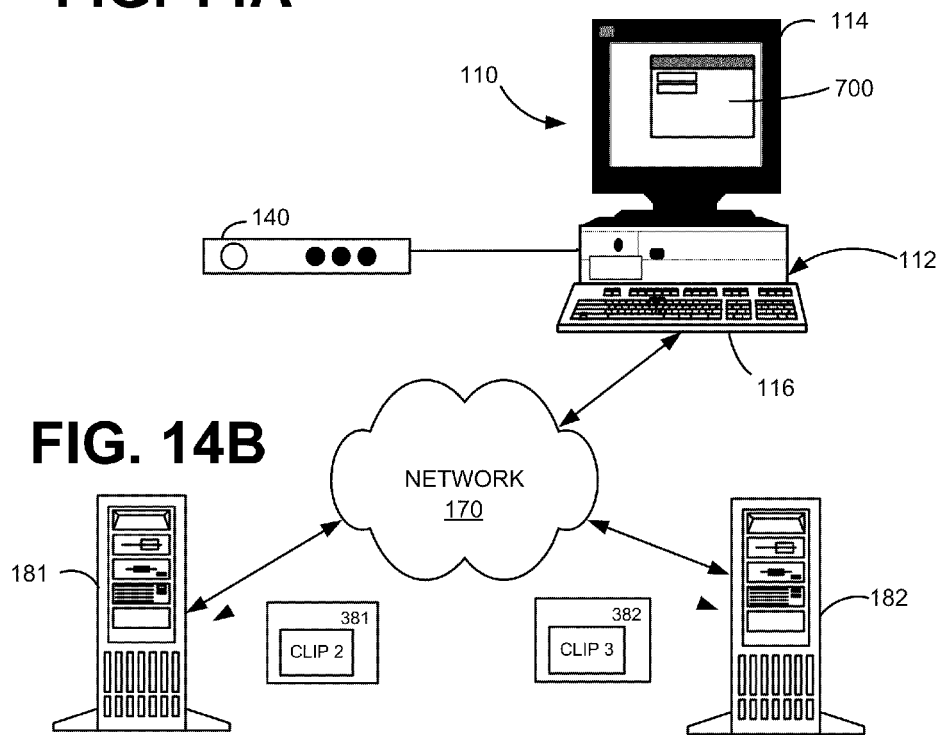
FIG. 14B illustrates a nonlimiting example of the first server multimedia content and a second server multimedia content to be exported to the first server and second server, respectively, in an embodiment of the system for producing multimedia content.
Figure 15A:
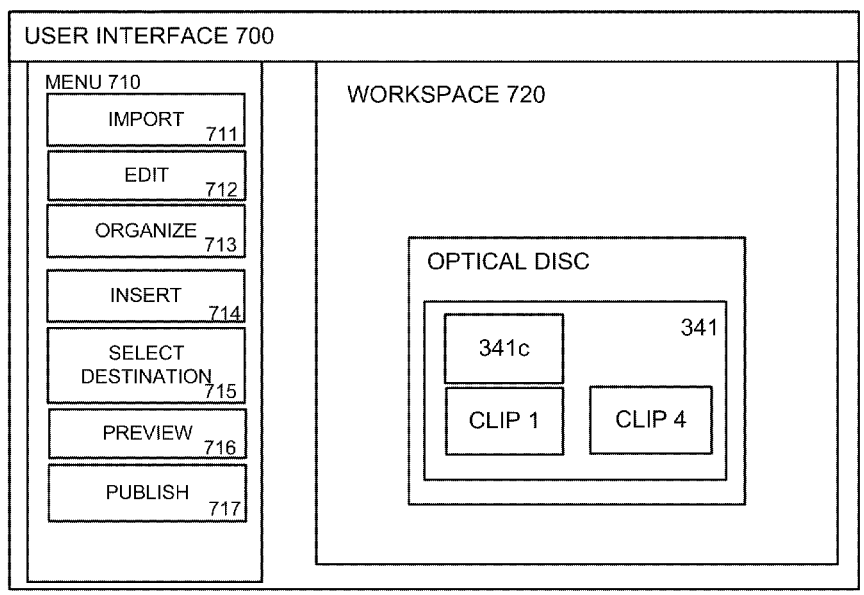
FIG. 15A illustrates an embodiment of the user interface displaying an optical disc multimedia content to be burned onto an optical disc.
Figure 15B:
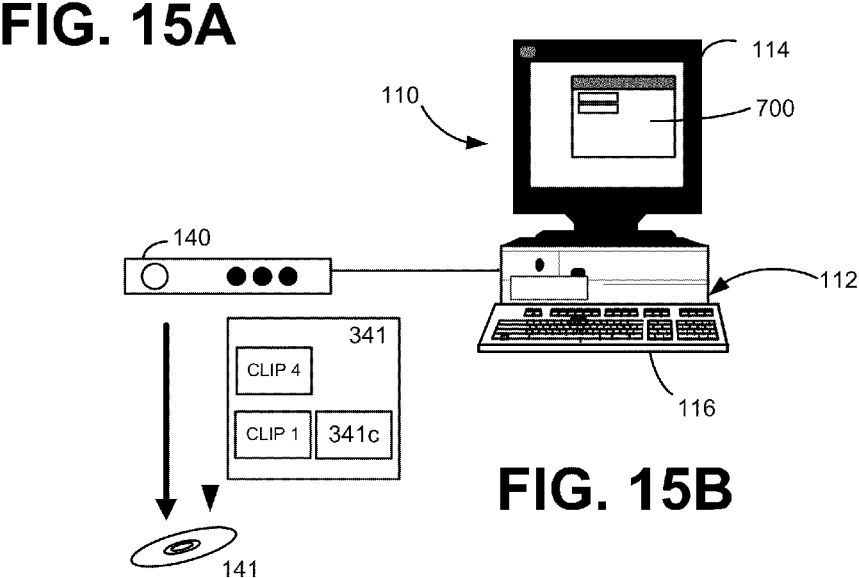
FIG. 15B illustrates an nonlimiting example of the optical disc multimedia content to be burned onto an optical disc in an embodiment of the system for producing multimedia content.

For example, in the nonlimiting example illustrated in FIGS. 14A, a user may select the publish button 717 on the menu 710 in the provided user interface 700. The selection of the publish button 717 is received as a trigger indicating that the first portion of the imported source content or the selected clips should be exported and/or that the second portion of the imported source content and the instructional content 341c should be burned onto an optical disc 141. Also, FIGS. 14A and 14B correspond to the nonlimiting example illustrated in FIG. 9, where clip 2 was selected for publishing on a first server 181, and clip 3 was selected for publishing on a second server 182. FIG. 14B illustrates clip 2 being exported from the personal computer 110 to the first server 181 and clip 3 being exported from the personal computer 110 to the second server 182. Also, FIGS. 15A and 15B correspond to the nonlimiting example illustrated in FIG. 11, where clip 1 and clip 4 were selected for burning on an optical disc 141. FIG. 15B illustrates clip 1 and clip 4 being burned onto an optical disc 141 using an optical disc drive 140 coupled to the personal computer 110.

In block 680, a first portion of the imported source content is exported to a first server 181. Further, in some embodiments, a third portion of the imported source content is exported to the second server 182. Responsive to receiving the trigger in block 670, the first portion of the imported source content or the selected clips are exported for storage as a first server multimedia content 381 on the first server 181 in block 680. Further, in some embodiments, responsive to receiving the trigger in block 670, the second portion of the imported source content and the instructional content 341c, which was generated in block 650, are burned as an optical disc multimedia content 341 onto the optical disc 141 in block 680. FIG. 14B is a nonlimiting example illustrating clip 2 being exported from the personal computer 110 to the first server 181 and clip 3 being exported from the personal computer 110 to second server 182. In some embodiments, a first server multimedia content 381 is exported to a first server 181.

In block 690, a second portion of the imported source content and the generated instructional content 341c is burned on an optical disc 141 as an optical disc multimedia content 341. FIG. 15B illustrates clip 1 and clip 4 being burned onto an optical disc 141 using an optical disc drive 140 coupled to the personal computer 110.

Any process descriptions or blocks in flow charts should be understood as representing modules, segments, or portions of code which include one or more executable instructions for implementing specific logical functions or steps in the process, and alternate implementations are included within the scope of the embodiments described in the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments in the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A non-transitory computer readable medium comprising instructions executable by a computer, wherein the instructions control operations of the computer to perform:
   importing a plurality of audiovisual clips;
   presenting a representation of the audiovisual clips on a display;
   controllably selecting a plurality of the imported audiovisual clips from the representation presented on the display, leaving a remainder of the audiovisual clips unselected;
   uploading the plurality of selected audiovisual clips to a server;
   generating an instructional content corresponding to the selected audiovisual clips, wherein the instructional content includes a location identification of the server; and burning, onto an optical disc, a plurality of the unselected audiovisual clips and the instructional content instead of the selected audiovisual clips.

2. The computer readable medium of claim 1, further comprising instructions that control operations of the computer to perform:
receiving a selection of the server as associated with the selected plurality of the imported audiovisual clips,
wherein the instructional content further comprises an association between the first server and the selected plurality of the imported audiovisual clips.

3. The computer readable medium of claim 2, wherein the instructional content comprises instructions for controlling an optical disc player to:
build a connection with the server based on a connection string according to a communications protocol; and
retrieve the uploaded plurality of selected audiovisual clips from the server.

4. A non-transitory computer readable medium comprising instructions executable by a computer that control the computer to perform:
importing a source content;
receiving a selection of a first portion of the imported source content;
generating an instructional content, wherein the instructional content comprises a first server identifying content and a relation between the first portion of the imported source content and a second portion of the imported source content;
exporting the first portion of the imported source content for storage as at least a portion of a first server multimedia content on a first server; and
burning, on an optical disc, the second portion of the imported source content and the instructional content as at least a portion of an optical disc multimedia content.

5. The computer readable medium of claim 4, further comprising instructions executable by a computer that control the computer to perform:
receiving a selection of the first server as associated with the first portion of the imported source content,
wherein the instructional content further comprises a first association between the first server and the first portion of the imported source content, and
wherein the first association between the first server and the first portion of the imported source content includes the first server identifying content and a file path content of the first portion of the imported source content.

6. The computer readable medium of claim 5, further comprising instructions executable by a computer that control the computer to perform:
receiving a selection of the second server as associated with a third portion of the imported source content; and
wherein the instructional content further comprises a second association between the second server and the third portion of the imported source content.

7. The computer readable medium of claim 4, wherein the optical disc multimedia content is in a BD-Live format or an iHD format.

8. The computer readable medium of claim 4, wherein the instructional content controls a first server configuration or defines a transmitting behavior of the first server.

9. The computer readable medium of claim 4, wherein the optical disc is readable by an optical disc player, the optical disc player being capable of an Internet connection, and the optical disc player including a virtual file system and at least one gigabyte of a local storage medium.

10. The computer readable medium of claim 4, wherein the instructional content comprises instructions for controlling an optical disc player to:
build a connection with the first server based on a connection string according to a communications protocol;
define a transmitting behavior for the first server corresponding to at least a portion of the first server multimedia content identified in the connection string; and
retrieve the at least a portion of the first server multimedia content from the first server via the built connection.

11. The computer readable medium of claim 10, wherein the connection string includes the first server identifying content.

12. The computer readable medium of claim 4, further comprising converting the second portion of the imported source content before burning the second portion of the imported source content onto the optical disc.

13. The computer readable medium of claim 4, wherein the instructional content further comprises instructions executable by the first server that cause the first server to convert at least a portion of the first server multimedia content stored on the first server for playback.

14. The computer readable medium of claim 13, wherein the converting of the at least a portion of the first server multimedia content depends on a transmitting condition.

15. The computer readable medium of claim 4, wherein the relation is defined by a timeline or storyboard.

16. A method for producing multimedia content, comprising:
providing a user interface;
importing a plurality of audiovisual clips;
receiving a selected audiovisual clip for publishing on a first server, wherein the imported plurality of audiovisual clips includes the selected audiovisual clip and at least one nonselected audiovisual clip;
associating the selected audiovisual clip with the first server;
generating an instructional content, wherein the instructional content comprises the first server identifying content and an association between the selected audiovisual clip and the first server;
exporting the selected audiovisual clip to the first server; and
burning the at least one nonselected audiovisual clip and a first server identifying content onto an optical disc, wherein the first server identifying content identifies the first server.

17. The method of claim 16, further comprising receiving an edit of one of the imported plurality of audiovisual clips on the provided user interface.

18. The method of claim 16, further comprising displaying a representation on the provided user interface corresponding to the imported plurality of audiovisual clips.

19. The method of claim 16, wherein the displayed representation comprises a thumbnail arranged on a storyboard, wherein the thumbnail corresponds to the selected audiovisual clip.

20. The method of claim 16, wherein the displayed representation comprises an audiovisual clip name arranged on a timeline, wherein the audiovisual clip name corresponds to the selected audiovisual clip and is identified as associated with the first server.

21. The method of claim 16, wherein the instructional content controls the first server configuration or defines a transmitting behavior of the first server.

22. The method of claim 16, wherein the instructional content comprises instructions for controlling an optical disc player to:

build a connection with the first server based on a connection string according to a communications protocol;

define a transmitting behavior for the first server corresponding to at least a portion of the first server multimedia content identified in the connection string; and retrieve the at least a portion of the first server multimedia content from the first server via the built connection.

23. The method of claim 16, wherein the instructional content further comprises instructions executable by the first server that cause the first server to convert at least a portion of the first server multimedia content stored on the first server for playback.

* * * * *